US012427768B2

(12) United States Patent
Angulo Navarro et al.

(10) Patent No.: US 12,427,768 B2
(45) Date of Patent: Sep. 30, 2025

(54) PRINTHEAD POSITIONS

(71) Applicant: Hewlett-Packard Development Company, L.P., Spring, TX (US)

(72) Inventors: Emilio Angulo Navarro, Sant Cugat del Valles (ES); Jose Antonio Alvarez Tapia, Sant Cugat del Valles (ES); Diego Lopez Ubieto, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 81 days.

(21) Appl. No.: 18/002,782

(22) PCT Filed: Jun. 22, 2020

(86) PCT No.: PCT/US2020/038970
§ 371 (c)(1),
(2) Date: Dec. 21, 2022

(87) PCT Pub. No.: WO2021/262138
PCT Pub. Date: Dec. 30, 2021

(65) Prior Publication Data

US 2023/0241888 A1 Aug. 3, 2023

(51) Int. Cl.
*B41J 2/125* (2006.01)
*B41J 2/045* (2006.01)

(52) U.S. Cl.
CPC ............ *B41J 2/125* (2013.01); *B41J 2/04561* (2013.01)

(58) Field of Classification Search
CPC .. B41J 2/16579; B41J 2/04561; B41J 2/2142; B41J 2/0451; B41J 2/125; B41J 2/01; B41J 2/165; B41J 29/393; B41J 29/38; B41J 2/04581; B41J 2/0456; C23C 16/44
See application file for complete search history.

(56) References Cited

U.S. PATENT DOCUMENTS

| | | | | |
|---|---|---|---|---|
| 6,582,049 | B2 | 6/2003 | Cook | |
| 6,983,188 | B2 | 1/2006 | Loughran et al. | |
| 7,091,134 | B1 | 8/2006 | Meinhold et al. | |
| 7,108,347 | B2 * | 9/2006 | Miyashita | B41J 2/0458 347/19 |
| 7,815,278 | B2 * | 10/2010 | Unosawa | B41J 2/125 347/19 |
| 9,033,452 | B2 | 5/2015 | Takada | |
| 2003/0011663 | A1 | 1/2003 | Sarmast | |

(Continued)

FOREIGN PATENT DOCUMENTS

| | | | |
|---|---|---|---|
| JP | 2005-131887 | A | 5/2005 |
| JP | 2005-246695 | A | 9/2005 |
| KR | 10-2007-0052167 | A | 5/2007 |

*Primary Examiner* — John P Zimmermann
(74) *Attorney, Agent, or Firm* — Jordan IP Law, LLC

(57) ABSTRACT

In one example a method comprises causing, by a processor, a nozzle of a printhead to discharge a printing fluid droplet toward a drop detector and receiving, from the drop detector, by a processor, a signal indicative of the location of the discharged printing fluid droplet. The example method comprises determining, by a processor, whether the location of the discharged droplet matches a stored location of the nozzle corresponding to a print mode. The example method comprises issuing, by a processor, a signal based on the determination.

14 Claims, 6 Drawing Sheets

(56) References Cited

U.S. PATENT DOCUMENTS

| | | | | |
|---|---|---|---|---|
| 2010/0247766 | A1 | 9/2010 | Forrest et al. | |
| 2012/0139982 | A1* | 6/2012 | Abe | B41J 2/2142 347/14 |
| 2012/0223997 | A1* | 9/2012 | Abe | B41J 2/16588 347/19 |
| 2014/0098156 | A1* | 4/2014 | Taff | B41J 2/04561 347/19 |
| 2014/0375718 | A1* | 12/2014 | Govyadinov | B41J 2/0451 347/14 |
| 2015/0191019 | A1* | 7/2015 | Ohnishi | B41J 2/2142 347/14 |
| 2018/0281421 | A1* | 10/2018 | Elgee | B41J 2/125 |
| 2021/0197487 | A1* | 7/2021 | Ge | B22F 12/53 |
| 2022/0153019 | A1* | 5/2022 | Kanzaki | B41J 2/04508 |

* cited by examiner

PRINTHEAD POSITIONS

BACKGROUND

In some print apparatuses, printing fluid such as ink is selectively discharged from a printhead, positioned in a carriage of the print apparatus, toward an advancing substrate.

BRIEF DESCRIPTION OF DRAWINGS

Examples will now be described, by way of non-limiting example, with reference to the accompanying drawings, in which.

DETAILED DESCRIPTION

Figure 1:
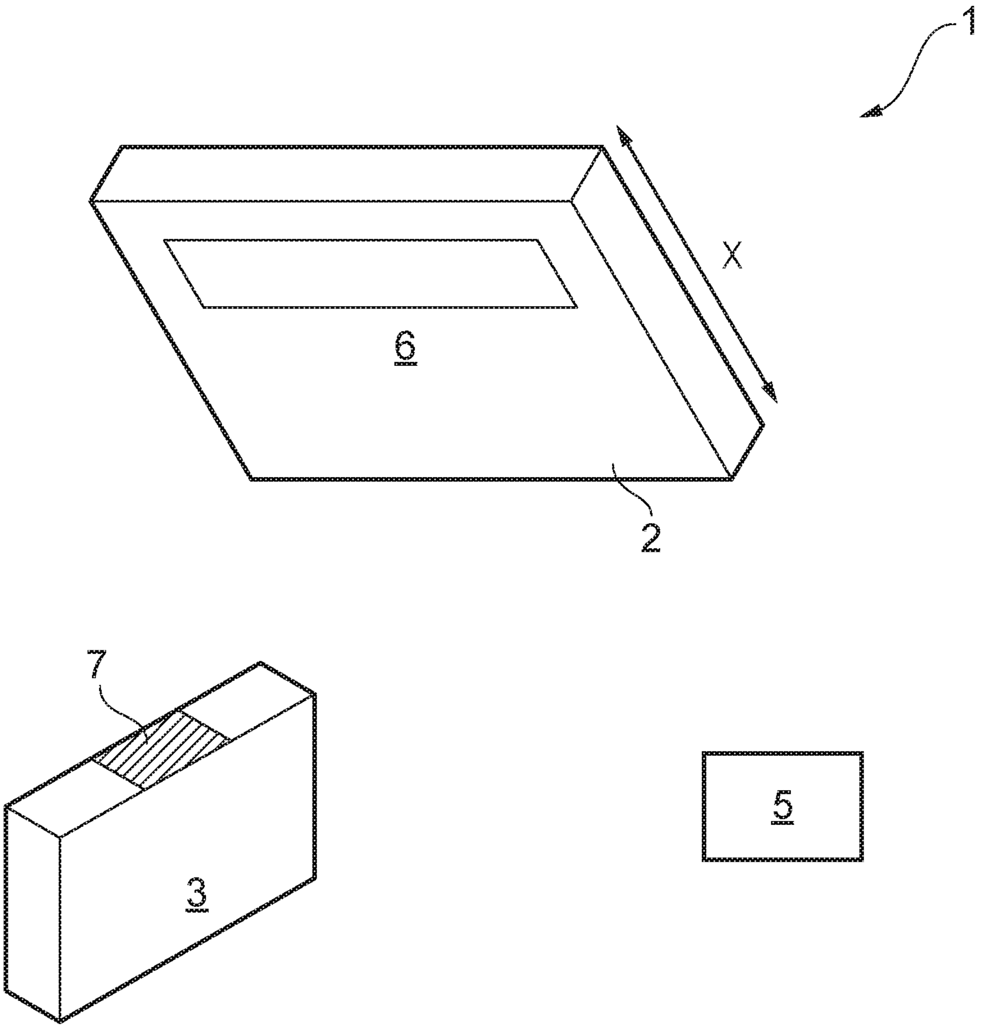
FIG. 1 is a simplified schematic of an example print apparatus.

In some example print apparatuses, printheads discharge printing fluid toward a substrate to print an image on the substrate as the substrate advances underneath the printhead. In these examples a printhead may be retained by a carriage which may be movable from side to side in a direction perpendicular to the direction of movement of the substrate. Such a carriage may be to retain a number of printheads. Each printhead may comprise a fluidic die (for example, a printhead die) which may comprise a nozzle array. For example, some fluidic dies may comprise a nozzle array comprising rows of nozzles, with sets of nozzles being to discharge a different type of printing fluid. For example, each nozzle set may respectively be to discharge black, cyan, magenta and yellow printing fluid. The nozzle array may comprise nozzles groups in two rows and each printhead may be to discharge a number of different colored printing fluids. In some examples, a printhead may be to discharge one color, e.g. through a set of rows of nozzles. In another example, a printhead may be to discharge two colors, in which example one group of nozzles may be to discharge one color with the other group of nozzles being to discharge the other color.

Each nozzle array may comprise a number of individual nozzles, each individual nozzle being to discharge printing fluid, with each individual nozzle being associated with a resistor (or firing resistor). In use, according to print data describing an image to be printed on the substrate, a carriage (e.g. retaining the printhead) may be caused to move (e.g. under the control of a controller or processor) and the individual nozzles may be caused to selectively discharge (e.g. under the control of a controller or processor) so that the image according to the print data is printed to the substrate. This may involve the one-at-a-time ejection of individual printing fluid droplets from the individual ink nozzles at the correct weight, speed and direction to place a correctly-sized fluid droplet at the correct location on the substrate so that the image is correctly generated according to the print data describing the image. The printhead may comprise a drop generator for each nozzle, which may comprise the resistor. Each drop generator may comprise a chamber with a refill channel and the nozzle. To eject a droplet of printing fluid, an electrical signal, such as an electrical pulse, may heat the resistor (for example an electrical current may be caused to flow through the resistor) to cause printing fluid in the chamber to vaporise and form a bubble. This bubble expands to propel a droplet of printing fluid out of the nozzle and, in this way, the electrical pulse through the resistor causes the selective discharge of printing fluid from the nozzles in a nozzle array of a fluidic die of a printhead. Ceasing the electrical pulse causes the bubble to collapse and the pressure differential from this collapse may cause fresh printing fluid to be drawn into the chamber through the refill channel.

In some example print apparatuses (for example, industrial printers) the carriage is to retain the printhead via a slot in the carriage. The engagement between the printhead and the carriage may be via a press-fit or interference-fit. However, as the utility of print apparatuses becomes more diverse, the print apparatus may operate according to a number of different modes of operation, or print modes, to perform particular jobs. For example, some print apparatuses may be to operate according to a print mode comprising, for example, a mode to print colors in symmetry, to add white printing fluid (e.g. an ink) to a substrate, or to print spot colors, etc.

According to some examples herein, a carriage is provided comprising a slot to receive a printhead in a number of positions (or locations relative to a remainder of the carriage), with each possible position corresponding to one type of print mode. In this way, a user may set the position of the printhead in the carriage for the print apparatus to perform a print job according to a print mode, e.g. by manually arranging. Some carriages may be able to receive multiple printheads, each in multiple positions. A user may be prompted, or alerted, to how to set the printhead positions in the carriage for the print apparatus to operate according to a specific print mode (e.g. printing colors in symmetry or adding white spots etc., as mentioned above). According to some examples herein there is provided a print apparatus and method for determining whether the printheads are correctly positioned in the carriage before starting a particular print job according to a selected print mode. As will be described below, an example print apparatus comprises a drop detector and the drop detector is used to make this determination.

In these examples, the drop detector may comprise a device to measure individual drops in-flight (e.g. following ejection from the nozzle and prior to deposition on a surface, or collection in a container). According to some examples, a drop detector may comprise an energy source (e.g. a light source), which may comprise an emitter, and a detector, with the detector being to detect any reflected energy from a fluid droplet. Put another way, the energy source may emit energy and if a fluid droplet is present then a portion of that emitted energy may be reflected (or back-scattered) off of the fluid droplet, this reflected energy being detected by the detector. This may be referred to as backscatter drop detection and, in examples where the energy source comprises a light source for emitting light, the detector may be to detect any light that is backscattered (or reflected, etc.) from a fluid drop that is passing through a focused light beam created by the energy source. The drop detector may comprise a lens to focus the emitted energy beam and/or a lens to focus the backscattered energy. According to some examples, the health of a nozzle (e.g. a health parameter for a nozzle) may be determined in this way, and several hundred nozzles per second may be tested by some example drop detectors. For example, and according to some example's herein, a nozzle's fitness to print may be assessed (e.g. by a processor or controller) based on the backscattered signal received from the drop detector (e.g. received by the processor or controller).

FIG. 1 shows a print apparatus 1 comprising a carriage 2, a drop detector 3 and a controller 5. The carriage 2 is a movable carriage 2 and is movable along the direction X, e.g. in a reciprocating or back-and-forth manner. The carriage 2 comprises a slot 6 to receive a printhead (not shown in FIG. 1) in a number of positions, with each position corresponding to a print mode of the apparatus 1. The controller 5 may be to control the print apparatus 1 and may comprise any of a processor, an associated memory, programming, electronic circuitry and/or components needed to control any of the elements of the print apparatus 1 for the print apparatus to print an image to a substrate (not shown in FIG. 1). For example, the controller 5 may be to control the carriage 2 to move (e.g. along the direction X) and may be to cause a printhead to selectively discharge printing fluid (e.g. ink) stored therein towards a substrate to print an image to the substrate according to print data operated on by, or at, the controller. The drop detector 3 is to detect the presence (and/or an absence) of printing fluid in a drop detection zone 7 of the drop detector 3. For example, the printhead may be positioned in the slot 6 of the carriage 2 and the carriage 2 may be moved (e.g. under the control of the controller 5) to position the printhead (e.g. a fluidic die or nozzle thereof) above the drop detection zone 7. The printhead may then be caused (e.g. by the controller 5) to fire a droplet of printing fluid. Due to the positioning of the printhead above the drop detection zone 7, the drop detector 3 is able to receive a backscattered signal from the discharged droplet. The drop detector 3 may be to send a signal, e.g. to the controller 5, indicative of the location of the detected printing fluid droplet.

According to the examples herein, the controller 5 is to cause a nozzle of a printhead to fire a printing fluid droplet and to receive a signal from the drop detector 3 indicating a position of the printing fluid droplet fired from the nozzle. The controller 5 is to determine whether the detected position of the printing fluid droplet matches a stored location for the nozzle (or printhead) for a print mode to determine whether the printhead is positioned correctly in the carriage 2 for the carriage 2 to operate according to that print mode. The controller 5 may therefore use the signal from the drop detector 3 to determine the location of the printhead comprising the nozzle. In other words, the controller 5 is able to check if the current carriage 5 arrangement matches a stored arrangement for a print mode so that the controller 5 can confirm that production can start in that mode. The print mode may be automatically selected, e.g. by the controller 5 (for example following a user input) or may be manually selected, e.g. by a user. In this way, some of the examples herein use a drop detector 3 (which may be an existing component of a print apparatus) to determine whether a printhead is correctly positioned for a print job to be performed. Therefore, in these examples no additional printer hardware may be added to a print apparatus for the apparatus to determine whether a printhead is correctly positioned. In turn, this may eliminate the impact to the manufacturing costs and also eliminate any new failure rates associated with the addition of new components.

In some examples, the controller 5 may be to issue an instruction to a user to change the location, or position, of the printhead relative to the carriage 2 (for example, to position the printhead differently in the slot 6) if there is not a match between the location of the nozzle and/or printhead (as determined by the controller 5 following the received signal from the drop detector 3) and the stored location of the nozzle or printhead. In some examples, the controller 5 may be to prevent a print operation from proceeding according to a print mode if there is not a match between the location of the discharged droplet and the stored location of the nozzle, since this may indicate that the nozzle is incorrectly positioned to start printing in the selected mode. If it is determined that the carriage 2 arrangement does not match with the arrangement of the printing mode the job needs, then the controller 5 may be to warn the user to re-check the printhead layout before starting production. Therefore, the controller 5 is able to read information captured by the drop detector 3, and check if there is a match between the position read by the drop detector 3 and the position that is stored for the production to be run. If there is a match, the printing can start, if not, then the user is warned that the printhead position must be checked and corrected.

Figure 2:
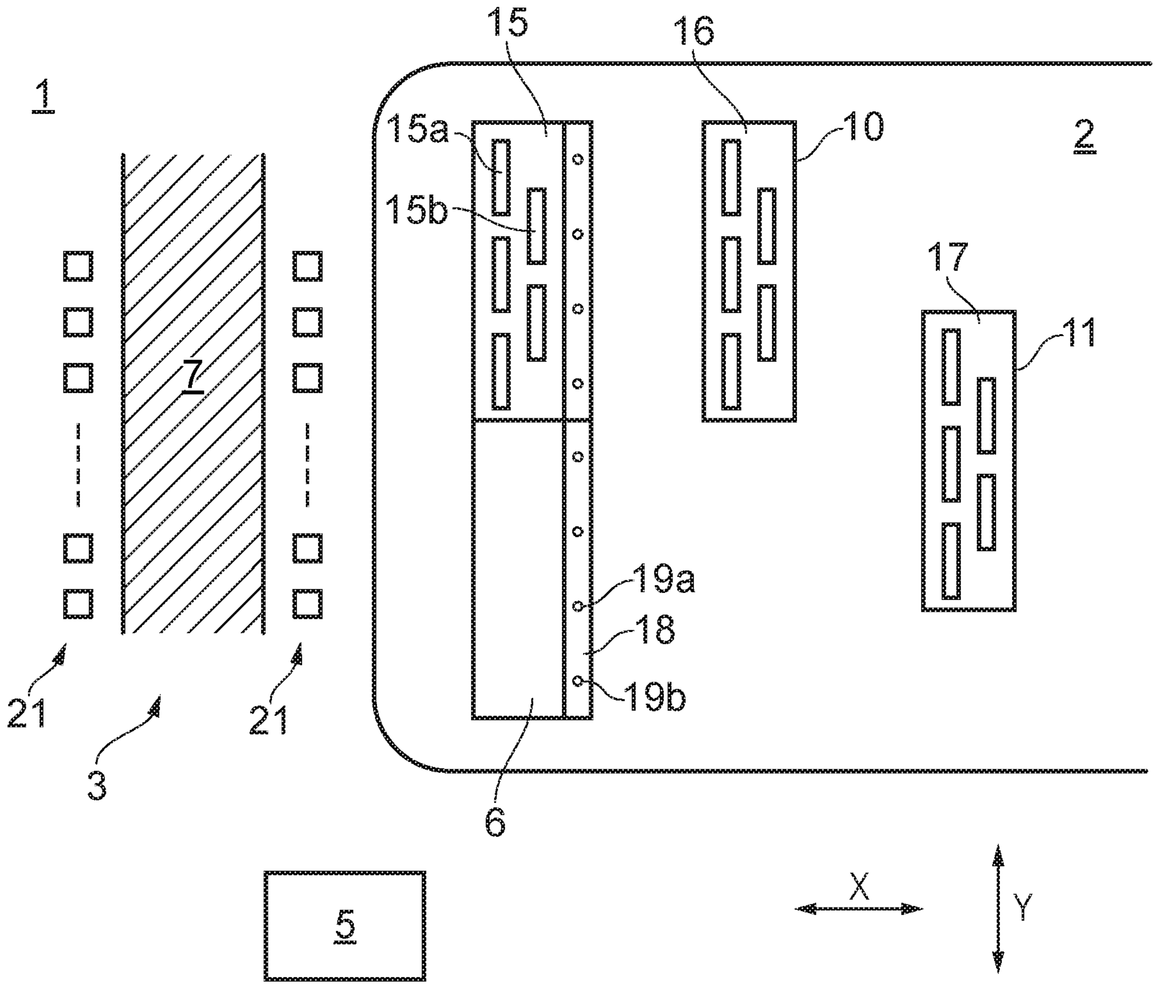
FIG. 2 is a simplified schematic of an underside of an example print apparatus.

FIG. 2 shows a print apparatus 1 according to another example and which may comprise the print apparatus of FIG. 1. In this example, in addition to the slot 6 which is to receive a printhead in a number of positions, the example carriage 2 of FIG. 2 comprises further slots 10 and 11 which are each to receive a printhead in a fixed position. In other words, the slots 10 and 11 may each be sized and dimensioned to receive a printhead such that a printhead is receivable in each of the slots in one (correct) position in contrast to the slot 6 which is dimensioned to receive the a printhead in a number of different positions. In this way, a user may not have freedom to position a printhead in one of the slots 10, 11 as there is one correct position and orientation that the printhead can be received in the slots 10, 11, but may have freedom to position the printhead in the slot 6. Each slot 10, 11 may therefore be referred to as a "fixed slot". These slots may comprise what may be termed a "pen pocket" which may comprise a housing for a printhead. The pen pocket may be attachable to the carriage 2. The carriage 2 may comprise the pen pocket. In these examples, the pen pocket may comprise a latch that it is openable by a user such that when the latch is opened a user is able to insert a printhead in the pen pocket. Once the latch is closed, the printhead is secured in its place, and the datum surfaces of the printhead may touch the corresponding datum surfaces of the pen pocket, and the pen pocket and the latch may comprise a bias element (e.g. a spring) to bias the datum surfaces of the printhead into contact with corresponding datum surfaces of the pen pocket. Thus, with the "fixed slots" 10, 11 the printheads have one position in which they are able to be received in the fixed slots 10, 11 as the pen pocket is attachable to the carriage at one position. By contrast, the slot 6 may be regarded as a "movable slot" in the sense that a printhead may be received in the slot 6 in a number of different positions. FIG. 2 shows three printheads, 15, 16 and 17 with printhead 15 being received in slot 6 and printheads 16 and 17 being received in the respective fixed slots 10 and 11. A guide 18 is provided at one end of the slot 6, the guide having a number of attachment points **19*a*, 19*b* (although two are labelled for simplicity of illustration), with the set of attachment points being to attach a pen pocket (as described above) to the guide 18 in a number of positons as will be described below. The guide 18 may be attached to the slot 6 or may be attached to another part of the carriage 2. The carriage 2 therefore may comprise the guide 18, for example the slot 6 may comprise the guide 18. The attachment points 19*a*, 19*b* may be to attach, or secure, a pen pocket to the slot 6, for example to fix the position of the pen pocket, and therefore the printhead 15 when the printhead 15 is received in the pen pocket, relative to the slot 6 and relative to the carriage 2 at a number of predetermined positions relative to the carriage 2. When a printhead 15 is received in the pen pocket, the datum surfaces of the printhead may be biased into contact with the datum surfaces of the pen pocket as descried above. As the pen pocket is attachable, via the points 19***a*, 19*b* to the guide at a number of discrete positions, the printhead 15 is therefore positionable relative to the carriage 2 in a number of discrete positions, and the corresponding datum surfaces may be biased into contact in each position. To fix the position of the pen pocket, a fixing such as a screw may be used to secure the pen pocket to the carriage 2. One such position of the printhead 15 shown in FIG. 2. FIG. 2 shows the printhead 15 being positioned at an uppermost (relative to the orientation of the Figure) position in the slot 6 (in the sense that a printhead 15 is received in the pen pocket which is secured to the guide 18 at an uppermost position) however FIG. 2 shows that there are other (lower relative to the Figure) positions within the slot 6 in which the pen pocket could be secured to the guide 18 and therefore in which the printhead 15 could be positioned. The guide 18 therefore facilitates the attachment of the the printhead 15 to the carriage 2, via the pen pocket, at various positions with each position corresponding to a selected print mode of the print apparatus.

The drop detector 3 comprises an array of transmitters and receivers, schematically indicated at 21, suitable for detecting (e.g. illuminating) printing fluid droplets, for example by emitting light energy. As descried above, the transmitters may be to emit an energy suitable for being scattered off of printing fluid and the receivers may be to detect any energy scattered from the printing fluid. For example the transmitters may comprise LEDs and/or may be to emit light and the receivers may be to detect light. The transmitters may be to emit energy toward the drop detection zone 7 of the drop detector 3 such that if a printing fluid is present in the drop detection zone it may be detected by the array 21.

The printheads 15, 16 and 17 of the FIG. 2 example each comprise five fluidic dies (or printhead dies), two are labelled 15*a*, 15*b* for the printhead 15 positioned in the slot 6 for simplicity of the description. Each die comprises an array of nozzles. Each nozzle may comprise an ejection orifice and be associated with a firing resistor formed on an integrated circuit chip of the die such that the controller 5 (operating on print data describing an image to be printed by the print apparatus 1) may selectively energise the nozzles, by controlling the resistors, to cause the nozzles to eject printing fluid in the appropriate sequence onto a substrate or print media advancing in the direction Y. The direction Y in FIG. 2 is the direction of media advance (or substrate) advance during a print job. In other words, in the example print apparatus 1 the carriage is movable in a direction perpendicular to the direction of media advance. To test an arrangement of the carriage 2, the carriage 2 may be moved (e.g. caused to move by the controller 5) in the direction X to position the printhead 15, that is retained by the carriage in the movable slot 6, over the drop detection zone 7. The controller 5 may cause a nozzle of the printhead 15 (e.g. of a fluidic die thereof) to fire a droplet of printing fluid toward the drop detection zone 7 and to receive, from the drop detector 3, a signal (e.g. a backscattered signal) indicative of the location of the printing fluid droplet. The controller 5 then uses that information to determine the location of the nozzle that has discharged the printing fluid droplet and to determine whether the printhead 15 is affixed to the guide 18 at the correct position (e.g. whether the pen pocket is fixed to the guide at the correct set of attachment points). More specifically, the controller 5 may access stored data relating to the position of the printhead 15 describing the correct location for the printhead 15 for the print apparatus 1 to operate according to a selected print mode, and to compare this data to the determined location to see whether there is a match. The controller 5 may therefore comprise, or be associated with, a database storing a position of the nozzle and/or printhead and an associated print mode (for example, in a look-up table) and to determine if the printhead 15 is positioned correctly the controller 5 may be to consult the database.

Figure 3A:
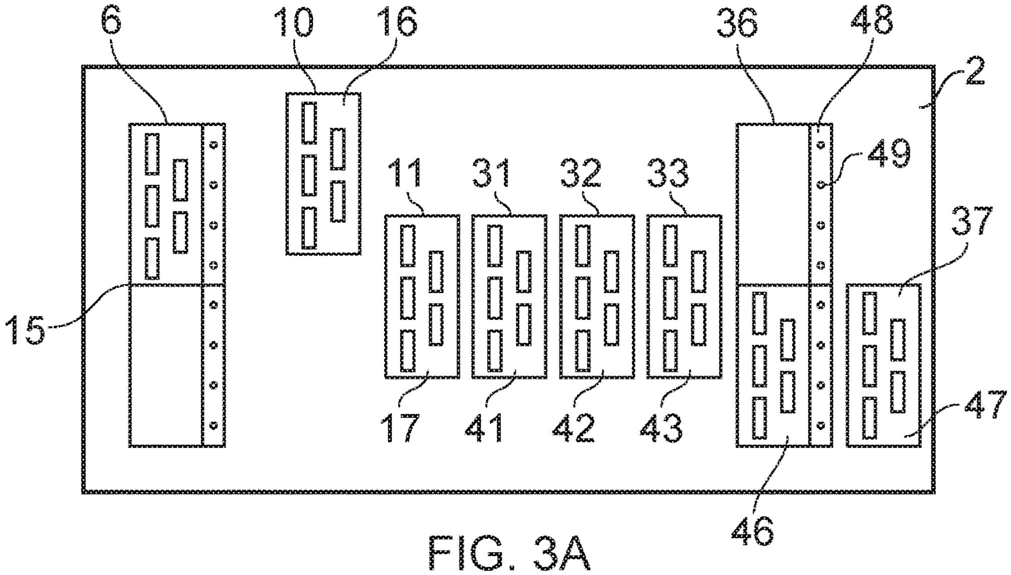
FIGS. 3A-3C are simplified schematics of an example print carriage.
Figure 3B:
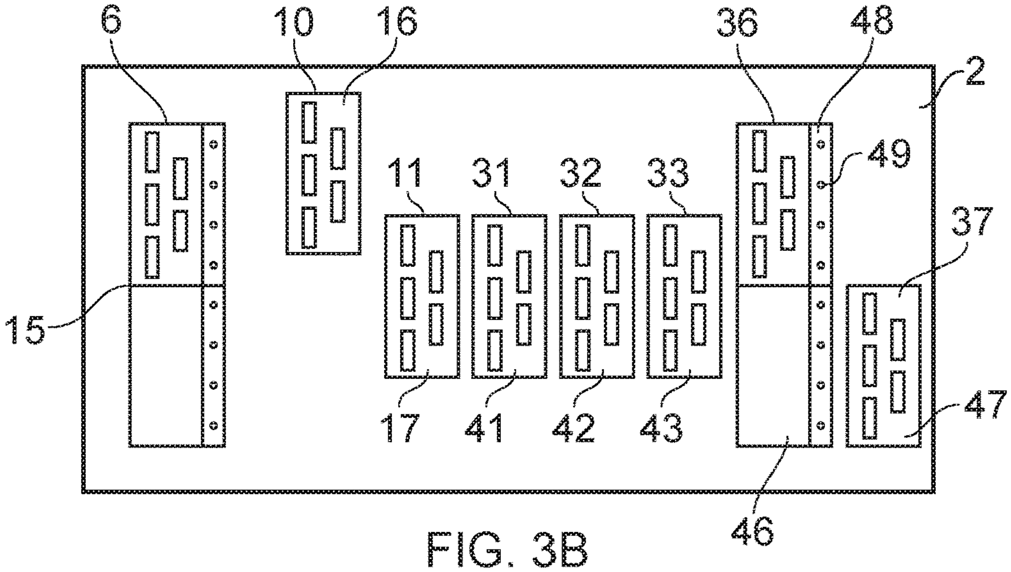
Figure 3C:
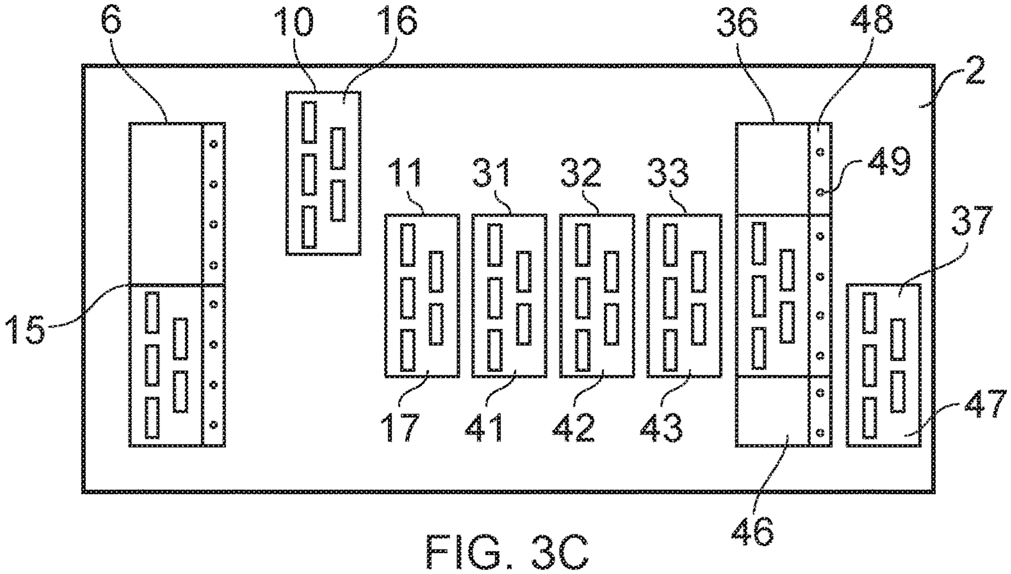

FIGS. 3A-3C illustrate an example carriage 2 according to three different arrangements. Each arrangement may correspond to a different print mode. The carriage 2 in this example comprises eight slots, 6, 10, 11, 31, 32, 33, 36, and 37. The slots 6, 10 and 11 of the carriage 2 comprise the respective slots as described above with reference to FIG. 2. The slots 31, 32, 33, and 37 are fixed slots (these slots being to receive and retain a printhead, via a pen pocket, in a fixed position relative to the carriage) and the carriage comprises a further "movable" slot 36, this slot 36 being to retain a printhead in a number of positions relative to the carriage with each position corresponding to a print mode. As shown in FIGS. 3A-3C, as for slot 6 a guide 48 is provided at one end of the slot 36, the guide having a number of attachment points 49 (one is labelled for simplicity of illustration). The guide 48 may be attached to the slot 36 or may be attached to another part of the carriage 2. The carriage 2 therefore may comprise the guide 48, for example the slot 36 may comprise the guide 48. The attachment points 49 may be to attach, or secure, a pen pocket, and therefore a printhead 46, to the slot 36, for example to fix the position of the printhead 46 relative to the slot 36 and relative to the carriage 2, e.g. as described above with reference to the slot 6 and guide 18. FIGS. 3A-3C show a printhead being retained in each slot, with printheads 15 and 46 being retained in their respective slots in different positions. Referring to slot 6 and slot 36 and the printheads 15 and 46 retained therein as, respectively, first and second slots 6, 36 and first and second printheads 15, 46, in FIG. 3A the first printhead 15 is positioned at an uppermost position in the first slot 6 relative to the carriage 2 and the second printhead 46 is positioned at a lowermost position in the second slot 36 relative to the carriage 2. In FIG. 3B the first and second printheads 15, 46 are both positioned at uppermost positions in the first and second slots 6, 36 relative to the carriage 2. In FIG. 3C the first printhead 15 is positioned at a lowermost position in the first slot 6 relative to the carriage 2 and the second printhead 46 is positioned at an intermediate position in the second slot 36 relative to the carriage 2. For example, according to one of the arrangements of FIGS. 3A-3C the color printheads may be arranged such that the carriage 2 is symmetrical about a centre such that the carriage 2 comprises the same colorants, and in the same order, from left to right and from right to left). Such a mode may be referred to as "color in symmetry" and may allow the carriage 2 to discharge more printing fluid in the same carriage pass and/or enable more productivity. However, for other applications that use white printing fluid, the white printhead may be located at the front or at the bottom of the layout of the carriage 2 as, according to some examples (for example, printing on transparent substrates), the carriage 2 may be arranged to discharge on the printing substrate first a layer of white printing fluid and then, subsequently, the colors on top of it. In other examples however, the carriage 2 may be arranged to discharge colored printing fluid first and then, subsequently, a white printing fluid layer on top of the colored fluid.

Each of FIGS. 3A-3C depict one arrangement of printheads 15 and 46 within the two "movable" slots 6, 36 of the carriage 2 with the printheads 16, 17, 41, 42, 43 and 47 being unchanged as these printheads are received in the fixed slots. Each arrangement may correspond to a print mode and the controller 5 may therefore be to determine whether both of the printheads 15, 46 are positioned correctly for the print apparatus 1 to operate according to a selected mode. For example, a print mode may need the first and second printheads 15, 46 to be positioned as shown in FIG. 3C. To determine whether they are positioned in the correct positions, the controller 5 may be to cause the carriage 2 to move such that a nozzle of one fluidic die of each printhead is positioned in the drop detection zone 7 and cause a nozzle of each printhead 15, 46 to discharge a printing fluid droplet. Based on a signal received from the drop detector 3 indicating the location of the discharged droplet from each nozzle the controller 5 may therefore be able to determine the location of each printhead 15, 46, and therefore whether they are positioned as shown in FIG. 3C.

Figure 4:
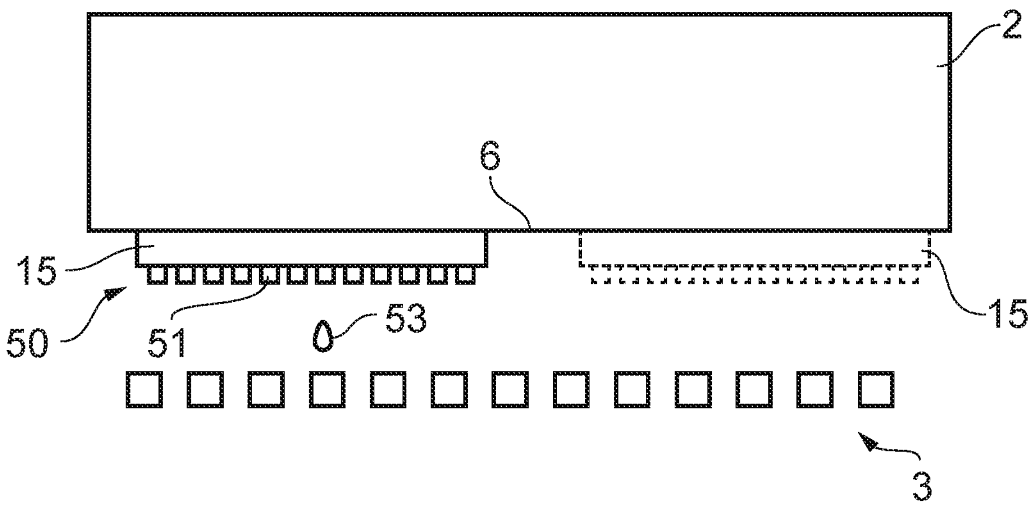
FIG. 4 is a simplified schematic side view of a carriage and drop detector.

FIG. 4 shows schematically a nozzle array 50 of a printhead 15. FIG. 4 shows, in solid lines, the printhead 15 being positioned in a first position in the slot 6 and an individual nozzle 51 of the nozzle array 50, or printhead die 50, being caused to fire a droplet 53. FIG. 4 also shows, in dotted lines, the printhead 15 being positioned in a second position in the same slot 6. For example the solid line may correspond to the position of the printhead 15 shown in FIG. 3A with the dotted line corresponding to the position of the printhead 15 shown in FIG. 3C. The controller 5 may cause the carriage 2 to move such that a nozzle of the printhead 15 is positioned over the drop detection zone 7 of the drop detector 3 such that the drop detector 3 can register the backscattered signal from a droplet discharged from that nozzle.

Figure 5:
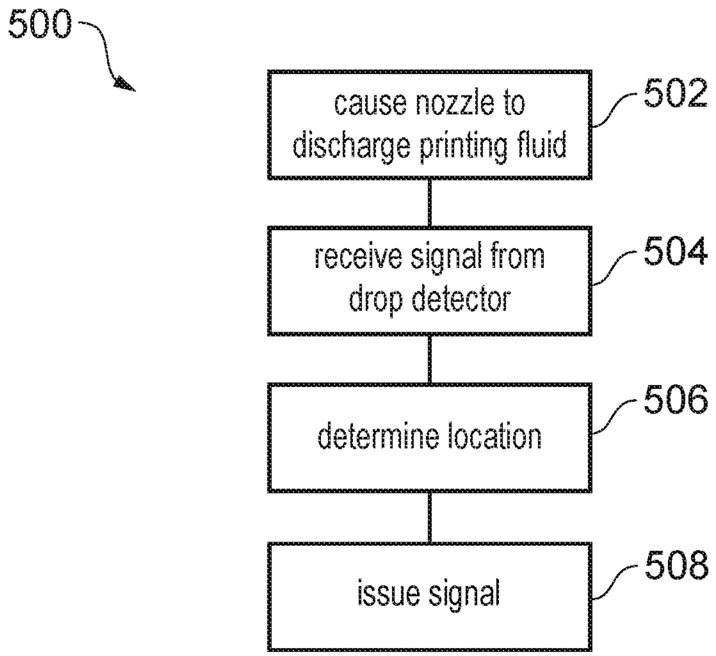
FIG. 5 is a flowchart of an example method.

FIG. 5 shows an example method 500. The method 500 may comprise a computer-implemented method. The method 500 may comprise a method of determining a position of a printhead of a print apparatus (for example the print apparatus 1 as described above with reference to FIGS. 1-4). The method 500 may comprise a method of determining whether a printhead of a print apparatus is correctly positioned to perform a print job (e.g. according to a print mode). The controller 5 as described above may be to perform the method 500.

At block 502 the method 500 comprises causing, by a processor, a nozzle of a printhead (such as the nozzle 51 of the printhead 15 as described above) to discharge a printing fluid droplet toward a drop detector. For example, block 502 may be performed by the controller 5 as the controller 5 may cause the nozzle to discharge the printing fluid droplet. Block 502 may comprise causing the nozzle to discharge the droplet toward a drop detection zone of the drop detector. As will be descried below with reference to the example method 600, block 502 may comprise moving a carriage containing the nozzle (for example, the carriage may comprise a printhead which comprises the nozzle) such that the nozzle is positioned over a drop detection zone of the drop detector.

At block 504 the method 500 comprises receiving, from the drop detector, by a processor, a signal indicative of the location of the discharged printing fluid droplet. Block 504 may comprise transmitting, by the drop detector, the signal, e.g. to the processor.

At block 506 the method 500 comprises determining, by a processor, whether the location of the discharged droplet (as determined, e.g. by a processor, from the signal received from the drop detector) matches a stored location of the nozzle corresponding to a print mode, e.g. a selected print mode (for example, automatically selected or selected by a user).

At block 508 the method 500 comprises issuing a signal, by a processor, for example to a user and/or operator, based on the determination at block 506.

For example if it is determined, at block 506, that the location for the nozzle matches the stored location then, at block 508 the signal comprises allowing a print operation to proceed according to the print mode. In some examples, printing may be prevented if (e.g. the signal at block 510 comprises a signal to prevent printing) it is determined that the nozzle location does not match the stored location. With reference again to FIG. 3, block 506 may comprise determining that the location of the nozzle that discharged the printing fluid droplet matches the printhead 15 position as depicted in FIG. 3A (e.g. at an upmost position in the carriage) but the stored location may indicate that, for printing to occur according to a particular print mode, the printhead should be in the position depicted in FIG. 3C. In this example, block 510 may comprise preventing printing.

Figure 6:
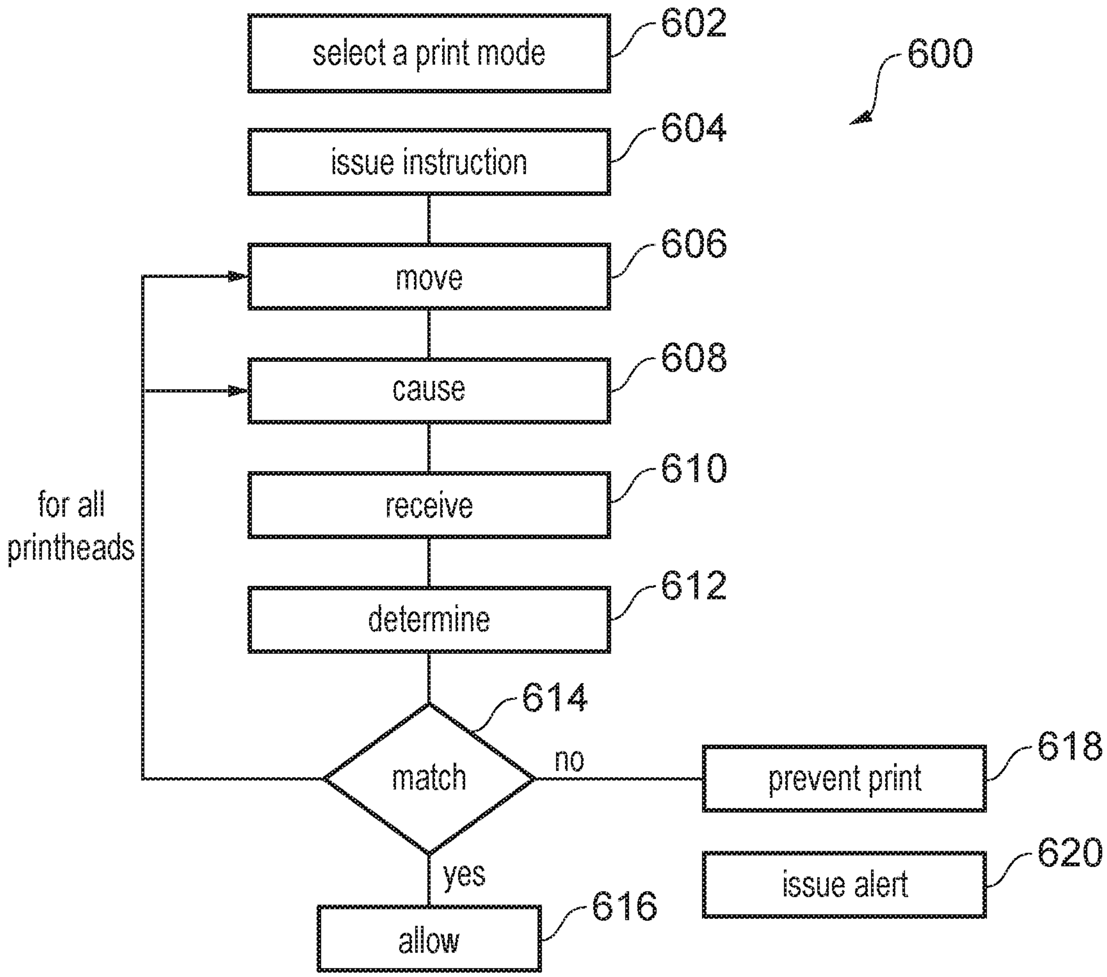
FIG. 6 is a flowchart of an example method.

FIG. 6 shows an example method 600. The method 600 may comprise a computer-implemented method. The method 600 may comprise a method of determining a position of a printhead of a print apparatus. The method 600 may comprise a method of determining whether a printhead of a print apparatus is correctly positioned to perform a print job (e.g. according to a print mode). The controller 5 as described above may be to perform the method 600. The method 600 may comprise the method 500 and blocks 606-614 may respectively comprise blocks 502-506 of the method 500.

At block 602, the method comprises selecting, by a processor, a print mode according to which a print job is to be performed. Block 602 may be performed automatically. Block 602 may be performed in response to a user input (for example a user may input the print mode). At block 604 the method comprises issuing, by a processor, an instruction (for example, an instruction to a user or operator) to position the printhead in a location corresponding to the print mode selected at block 602 of the method. In the example of FIG. 6, and as described above with reference to FIGS. 1-4, the printhead may be retained in a carriage, the carriage being to retain the printhead in a number of predefined positions with each predefined positon corresponding to a print mode. In these examples, the instruction issued at block 604 may comprise an instruction to position a printhead in a movable slot (see slot 6 as described above) in a particular location in that slot (see FIGS. 3A-3C), for example by referring to a position of the printhead relative to the guide (e.g. the guide 18 or 48).

At block 606 the method comprises moving, by a processor, the printhead so that a nozzle of the printhead is positioned about or above a drop detector such that a discharged printing fluid droplet from the nozzle can be detected by the drop detector. Block 606 may comprise moving the printhead such that the nozzle is positioned over a drop detection zone of the drop detector. Block 606 may comprise causing a carriage that retains the printhead to move relative to the drop detector to position the nozzle.

At block 608 the method comprises causing, by a processor, a nozzle of a printhead to discharge a printing fluid droplet toward the drop detector, for example as described above with respect to block 502 of the method 500. At block 610 the method comprises receiving, from the drop detector, by a processor, a signal indicative of the location of the discharged printing fluid droplet, for example as described above with respect to block 504 of the method 500. At block 612 the method comprises determining, by a processor, whether the location of the discharged droplet matches a stored location of the nozzle corresponding to a print mode, for example as described above with respect to block 506 of the method 500. At block 614 it is determined whether there is a match between the location of the discharged droplet and the stored location of the nozzle. For example, the stored location of the nozzle may correspond to a print mode and, at block 614, by determining whether the position of the nozzle (as determined by the location of the printing fluid droplet that it discharged) matches a stored location for that nozzle for a print mode, it may be determined whether the printhead is correctly positioned to print according to the print mode. If it is determined that there is a match (e.g. at block 614) then at block 616 the method comprises allowing a print operation to proceed according to the print mode. For example, the signal issued by the processor (see block 508 of the method 500) may comprise allowing the print operation to proceed according to the print mode.

If, at block 614, it is determined that the location does not match the stored location then at block 618 the method 600 comprises preventing, by a processor, a print operation from proceeding according to the print mode (selected at block 602) and at block 620 the method 600 comprises issuing an alert or instruction (for example to a user or operator) to change the location of the printhead relative to the carriage. In this way, if the printhead is not positioned correctly for printing to proceed according to a given print mode then a user may be instructed (at block 620) to position the printhead correctly. For example the instruction may comprise information that may enable a user to know the correct position of the printhead for printing to proceed according to the selected mode. Therefore, the signal issued by the processor (see block 508 of the method 500) may comprise preventing, by a processor, a print operation from proceeding according to the print mode and/or issuing an alert or instruction (for example to a user or operator) to change the location of the printhead relative to the carriage.

As indicated by the looping arrow in FIG. 6, blocks 608-614 (and 606) may be repeated, e.g. for each printhead in the carriage. In examples where a carriage is to retain a number of printheads with each printhead being retainable in a slot of the carriage in a number of predefined positions each corresponding to a different printhead (e.g. slots 6 and 36 in the carriage 2 as discussed above can retain printheads 15, 46 in a number of positions), the method 600 is to repeat blocks 608-614 for each printhead. In these examples, the method 600 comprises, for each printhead in a print apparatus: causing, by a processor, a nozzle of the printhead to discharge a printing fluid droplet toward a drop detector, receiving, from the drop detector, by a processor, a signal indicative of the location of the discharged printing fluid droplet, determining, by a processor, whether the location of the discharged droplet matches a stored location of the nozzle corresponding to a print mode and, if there is a match between the location of the discharged droplet and the stored location of the nozzle, allowing a print operation to proceed according to the print mode (or preventing, see block 618, printing from proceeding, etc.). As indicated by the two-pronged arrow, some examples may comprise re-executing block 606. For example, for a printing fluid droplet discharged by a nozzle of a different printhead to be registered by the drop detector, the carriage may need moving such that the nozzle is positioned above the drop detector.

Figure 7:
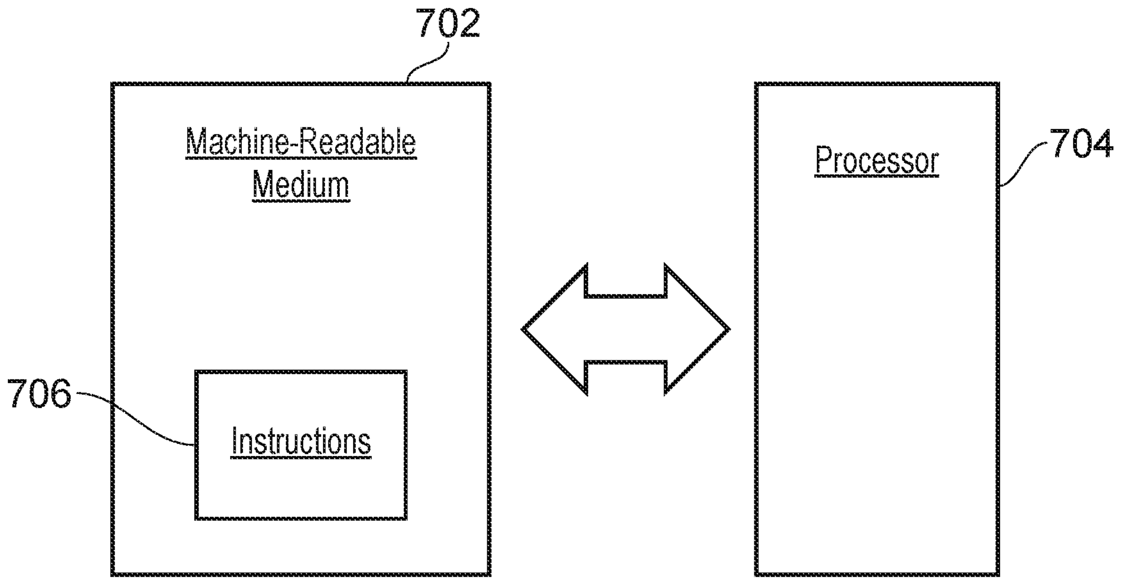
FIG. 7 is a simplified schematic of an example machine-readable medium in association with a processor.

FIG. 7 shows an example non-transitory machine-readable, or computer-readable, medium 702 comprising a set of machine-readable instructions 706 stored thereon. The medium 702 is shown in FIG. 7 in association with a processor 704. The controller 5 as described above may comprise the medium 702 and/or the processor 704. The instructions 706 when executed by the processor 704 are to cause the processor to perform a task. For example, the instructions 706, when executed by the processor 704, may be to cause the processor 704 to perform the method 500 or 600 as described above, e.g. any of the blocks thereof. The instructions 706, when executed by the processor 704 are to cause the processor to cause a fluidic die of a print apparatus to discharge a printing fluid toward a drop detector. The instructions 706, when executed by the processor 704, are to cause the processor to receive a signal from the drop detector describing the position of the discharged printing fluid relative to the drop detector. The instructions 706, when executed by the processor 704 are to cause the processor to determine whether the relative position of the discharged printing fluid matches a stored position of the fluidic die for the fluidic die to operate according to a first mode of operation of the print apparatus. The instructions 706, when executed by the processor 704 are to cause the processor to issue a signal to a user of the print apparatus based on the determined position (for example, to alert a user of the print apparatus if the determined position of the discharged printing fluid does not match the stored position).

In some examples, the instructions 706 may be to cause the processor 704 to receive an input (for example a user input) describing a print mode according to which the print apparatus is to perform a print operation. In these examples the instructions 706 maybe to cause the processor 704 to select a print mode. The instructions 706 may be to cause the processor 704 to, if the determined and stored positions do not match, issue an instruction (for example to a user) to position the fluidic die in a position (for example relative to a carriage) corresponding to the mode of operation of the print apparatus, e.g. based on a stored position for the fluidic die for the selected mode of operation. In some examples, if the determined position of the discharged fluid does not match the stored position then the instructions 706, when executed by the processor 704 may be to cause the processor 704 to prevent the print apparatus from performing a print job according to the mode of operation.

In some examples, following an input selecting a first mode of operation of the print apparatus, the instructions 706 may be to cause the processor 704 to cause a fluidic die of each printhead of the print apparatus to discharge a printing fluid toward a drop detector, receive a signal from the drop detector describing the position of each discharged printing fluid relative to the drop detector, determine whether the relative position of the discharged printing fluid matches a stored position of the fluidic die for each printhead, for each printhead to operate according to the selected first mode of operation of the print apparatus.

Some examples herein are able to utilise the drop detector, which may be already present in some printing systems, to determine whether the printheads are positioned correctly in the carriage for the print apparatus to perform according to a selected mode. In this way, the correct placement of the printheads is able to be determined without the addition of new hardware, which in turn means that there is no direct impact on the manufacturing costs of the apparatus and no failure rate added due to new components.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

causing, by a processor, a nozzle of a printhead to discharge a printing fluid droplet toward a drop detector, prior to performing a print operation for a print job, wherein the drop detector comprises at least one light source transmitter and at least one light source receiver for transmitting a light signal by the at least one light source transmitter toward the printing fluid droplet and receiving a backscattered signal reflected off of the printing fluid droplet by the at least one light source receiver, wherein the at least one light source receiver is on a same side as the at least one light source transmitter;

receiving, from the drop detector, by a processor, a signal indicative of the location of the discharged printing fluid droplet;

determining, by a processor, whether the location of the discharged droplet matches a stored location of a printhead containing the nozzle corresponding to a print mode;

issuing, by a processor, a signal based on the determination; and preventing, by a processor, the print operation for the print job from proceeding according to the print mode if there is not a match between the location of the discharged droplet and the stored location of the printhead.

2. A method according to claim 1, further comprising, if there is a match between the location of the discharged droplet and the stored location of the nozzle, allowing a print operation to proceed according to the print mode.

3. A method according to claim 1, further comprising, if there is not a match between the location of the discharged droplet and the stored location of the nozzle, issuing, by a processor, an instruction to a user to change the location of the printhead relative to a carriage retaining the printhead.

4. A method according to claim 1, further comprising, prior to causing, by a processor, the nozzle to discharge the printing fluid droplet, selecting, by a processor, a print mode according to which a print job is to be performed, wherein the determining comprises:

determining, by a processor, whether the location of the discharged droplet matches a stored location of the nozzle corresponding to the selected print mode.

5. A method according to claim 4, further comprising, prior to causing, by a processor, the nozzle to discharge the printing fluid droplet, issuing, by a processor, an instruction to the user to position the printhead in a location corresponding to the selected print mode.

6. A method according to claim 1 wherein the printhead is retained in a carriage, the carriage being to retain the printhead in a number of predefined positions, each predefined position corresponding to a print mode, and wherein the stored location of the nozzle corresponds to the predefined position of the printhead for the print mode.

7. A method according to claim 1 wherein a carriage is to retain a number of printheads, each printhead being retainable in a slot of the carriage and each slot of the carriage being to retain a printhead in a number of predefined positions, the method further comprising, for each printhead in a print apparatus, causing, by a processor, a nozzle of the printhead to discharge a printing fluid droplet toward a drop detector;

receiving, from the drop detector, by a processor, a signal indicative of the location of the discharged printing fluid droplet;

determining, by a processor, whether the location of the discharged droplet matches a stored location of the nozzle corresponding to a print mode and, if there is a match between the location of the discharged droplet and the stored location of the nozzle, allowing a print operation to proceed according to the print mode.

8. A print apparatus comprising:

a movable carriage having a slot to receive a printhead in a number of positions, each position corresponding to a print mode;

a drop detector to detect the presence of printing fluid in a drop detection zone, wherein the drop detector comprises at least one light source transmitter and at least one light source receiver for transmitting a light signal by the at least one light source transmitter toward the printing fluid droplet and receiving a backscattered signal reflected off of the printing fluid droplet by the at least one light source receiver, wherein the at least one light source receiver is on a same side as the at least one light source transmitter; and a controller to cause a nozzle of a printhead to fire a printing fluid droplet, prior to performing a print operation for a print job, and to receive a signal from the drop detector indicating a position of the printing fluid droplet fired from the nozzle, the controller to determine whether the detected position of the printing fluid droplet matches a stored location for the printhead containing the nozzle when the carriage is to operate in a print mode to determine whether the printhead is positioned correctly in the carriage for the carriage to operate in the print mode and prevent the print operation for the print job from proceeding according to the print mode if there is not a match between the determined position of the printhead and the stored location of the printhead.

9. A print apparatus according to claim 8, wherein the slot comprises a number of points at which the printhead may be fixed to the carriage to be retained by the carriage in a number of predetermined positions, each predetermined position corresponding to a print mode.

10. A print apparatus according to claim 8 wherein the carriage comprises a number of slots, each slot being to receive a printhead in a number of positions, each position of each printhead within a respective slot corresponding to a print mode.

11. A print apparatus according to claim 10, wherein the controller is to cause a nozzle of each printhead to fire a printing fluid droplet and to receive a signal from the drop detector indicating a position of the printing fluid droplet fired from the nozzle, the controller to determine whether the detected position of the printing fluid droplet matches a stored location for each nozzle when the carriage is to operate in a print mode to determine whether each printhead is positioned correctly in the carriage for the carriage to operate in the print mode.

12. A non-transitory machine-readable storage medium comprising a set of machine-readable instructions stored thereon which, when executed by a processor, cause the processor to:

cause a fluidic die of a print apparatus to discharge a printing fluid toward a drop detector prior to performing a print operation for a print job, wherein the drop detector comprises at least one light source transmitter and at least one light source receiver for transmitting a light signal by the at least one light source transmitter toward the printing fluid droplet and receiving a backscattered signal reflected off of the printing fluid droplet by the at least one light source receiver, wherein the at least one light source receiver is on a same side as the at least one light source transmitter;

receive a signal from the drop detector describing the position of the discharged printing fluid relative to the drop detector;

determine from the position of the discharged printing fluid whether the relative position of the fluidic die matches a stored position of the fluidic die for the fluidic die to operate according to a first mode of operation of the print apparatus; and to issue a signal to a user of the print apparatus based on the determined position; and if the determined position of the fluidic die does not match the stored position of the fluidic die, prevent the print apparatus from performing the print operation of the print job according to the first mode of operation.

13. A non-transitory machine-readable storage medium according to claim 12, wherein the instructions, when executed by the processor, cause the processor to, following an input selecting the first mode of operation of the print apparatus:

if the determined position of the discharged fluid does not match the stored position, issue an instruction to a user to position the fluidic die in a position corresponding to the first mode and the stored position.

14. A non-transitory machine-readable storage medium according to claim 12, wherein the instructions, when executed by the processor, cause the processor to, following an input selecting a first mode of operation of the print apparatus:

cause a fluidic die of each printhead of the print apparatus to discharge a printing fluid toward a drop detector;

receive a signal from the drop detector describing the position of each discharged printing fluid relative to the drop detector; and determine whether the relative position of the discharged printing fluid matches a stored position of the fluidic die for each printhead, for each printhead to operate according to the selected first mode of operation of the print apparatus.

* * * * *